(12) United States Patent
Bae et al.

(10) Patent No.: US 8,647,789 B2
(45) Date of Patent: *Feb. 11, 2014

(54) VISUALIZATION APPARATUS FOR LARGE AREA PEMFC

(75) Inventors: Joongmyeon Bae, Daejeon (KR); Dongryul Lee, Hwaseong-si (KR)

(73) Assignee: Korean Advanced Institute of Science and Technology, Daejeon (KR)

( * ) Notice: Subject to any disclaimer, the term of this patent is extended or adjusted under 35 U.S.C. 154(b) by 535 days.

This patent is subject to a terminal disclaimer.

(21) Appl. No.: 12/976,869

(22) Filed: Dec. 22, 2010

(65) Prior Publication Data

US 2011/0159387 A1 Jun. 30, 2011

(30) Foreign Application Priority Data

Dec. 29, 2009 (KR) .................. 10-2009-0132734

(51) Int. Cl.
*H01M 2/38* (2006.01)
*H01M 2/40* (2006.01)
*H01M 8/24* (2006.01)
*H01M 8/04* (2006.01)
*H01M 2/02* (2006.01)
*H01M 2/08* (2006.01)
*H01M 8/10* (2006.01)

(52) U.S. Cl.
USPC ........... 429/459; 429/432; 429/452; 429/463; 429/457; 429/458; 429/471; 429/483

(58) Field of Classification Search
USPC ......... 429/463, 471, 455, 456, 457, 479, 490, 429/459, 432, 452, 458, 483
See application file for complete search history.

(56) References Cited

U.S. PATENT DOCUMENTS

| 6,322,914 | B1 | 11/2001 | Chow et al. |
| 8,137,827 | B2 * | 3/2012 | Bae et al. ................... 429/8 |
| 8,367,262 | B2 * | 2/2013 | Bae et al. .................. 429/434 |
| 2005/0053814 | A1 * | 3/2005 | Imamura et al. ............ 429/22 |
| 2006/0127729 | A1 | 6/2006 | Roscoe et al. |
| 2008/0107955 | A1 * | 5/2008 | Akita et al. ................. 429/34 |

FOREIGN PATENT DOCUMENTS

| JP | 2004-071299 | * | 4/2004 | ............. H01M 8/02 |
| JP | 2006228671 A | | 8/2006 | |

OTHER PUBLICATIONS

Machine translation of JP 2004-071299, Apr. 2004, pp. 1-4.*
Shimoi et al., Visualization of the Membrane Temperature Field of a Polymer Electrolyte Fuel Cell, Journal of Energy Resources Technology, 2004 (126), 258-261.

* cited by examiner

*Primary Examiner* — Patrick Ryan
*Assistant Examiner* — Julian Anthony
(74) *Attorney, Agent, or Firm* — The Webb Law Firm

(57) ABSTRACT

Provided is a visualization apparatus for a PEMFC using a transparent window. More particularly, provided is a visualization apparatus for a large are PEMFC including: a plurality of visualization apparatuses for region cells including current collector plates each provided on both sides of a membrane electrode assembly of a PEMFC and formed with channels through which reaction gas and products flow and a transparent provided on the outer surface of the current collector plate. Further, provided is a visualization apparatus for a large area PEMFC electrically connecting the current collector plates of the visualization apparatus for region cells to each other in parallel.

1 Claim, 4 Drawing Sheets

VISUALIZATION APPARATUS FOR LARGE AREA PEMFC

TECHNICAL FIELD

The present invention relates to a visualization apparatus for a large area PEMFC using a transparent window, and more particularly, to a visualization apparatus for a large area PEMFC capable of having conditions approximating a real PEMFC by implementing a single large area PEMFC having a large reaction area by electrically connecting a plurality of visualization apparatuses for region cells having a small unit reaction area in parallel and connecting them to each other in series in distributing fuel.

BACKGROUND ART

As environmental regulations of automobile markets are increasingly tightened, the world's carmakers have tried to develop environment-friendly and high-efficient cars. It is expected that the fuel-cell car will emerge as the center focus of an automobile market in the future because it is environmentally friendly in that it only discharges water while having high efficiency. As a result, many carmakers have continued to develop a fuel-cell car. A demand for a fuel-cell technology has continuously increased in the industrial world and the academic world. Therefore, research into a PEMFC for a car, for example, a proton exchange membrane fuel cell (PEMFC), has been actively conducted.

An operating temperature of a general PEMFC shown in FIG. 1 is less than 100° C. Therefore, water generated due to the reaction of hydrogen with oxygen is a liquid phase. When the liquid phase water is discharged while flowing in a PEMFC channel along with air, this is called a flooding phenomenon. The flooding phenomenon has been known as one of the main factors that degrade PEMFC performance. However, since it is difficult to visualize a two-phase flow in the PEMFC channel, research into the flooding has been mainly conducted through interpretation using a CFD.

In addition to the CFD, a method of observing the flooding by visualizing the two-phase flow in the PEMFC channel has been used. As an example, there is a method of observing the flooding in the PEMFC channel by using a neutron beam. Even though there is no need to change the components of the PEMFC in order to observe the behavior of water using the neutron beam, and reliability is at the highest, an apparatus generating the neutron beam is very expensive. In addition, it is difficult to specifically know how water is discharged since a method of processing the image data is complex and the interface of water with air is unclear. In addition, since the image using the neutron beam is consequently implemented in a two-dimensional plane, it is difficult to know whether or not water is present in an anode or a cathode state.

Therefore, researchers in and outside the country have mainly used a visualization method using a transparent window. The method can directly visualize the two-phase flow within the channel, such that it can specifically observe the shape where water flows. However, unlike the real PEMFC, since a visualization apparatus using the visualization method uses a current collector plate 600 in which a passage is formed on a metal plate having a thickness of about 1 mm as shown in FIG. 2, instead of using a separator 60 shown in FIG. 1 in order to perform visualization, it has a larger possibility of distorting the two-phase flow within a channel 610, as compared to the real PEMFC. Therefore, it is very important to secure the reliability by comparing an I-V characteristic curve between the real PEMFC and the visualization apparatus.

Generally, the visualization apparatus includes a transparent plate 700 provided on the outer side of the current collector plate 600 to visually observe the channel 610 of the current collector plate 600, as shown in FIG. 2.

In observing the PEMFC using the visualization apparatus, the PEMFC applied to a real car and a household power generation system has a large reaction area of 300 cm$^2$ or more, while the visualization apparatus having the reaction area of about 100 cm$^2$ has been mainly used in a laboratory. There is a problem in that the experiment is made in environment different from the real PEMFC. In order to solve the problem, the large-area visualization apparatus having the substantially same size is manufactured, which largely increases the space and costs.

DISCLOSURE

Technical Problem

An object of the present invention is to provide a visualization apparatus for a large area PEMFC having a reaction area under conditions approximating a large area PEMFC really applied in a narrow experimental space.

Technical Solution

In one general aspect, a visualization apparatus for a large area PEMFC includes: a plurality of visualization apparatuses for region cells including current collector plates 600 each provided at both sides of a membrane electrode assembly 50 of a PEMFC and formed with channels 610 through which reaction gas and products flow and transparent plates 700 provided at the outer surfaces of the current collector plates 600, wherein it is configured by electrically connecting the current collector plates of the visualization apparatuses for region cells to each other in parallel.

Fuel distribution structures supplying reaction gas to the channels of the visualization apparatuses for each region cell and discharging products from the channels may be connected to each other in series.

The visualization apparatus for a large area PEMFC may further include a region cell monitoring unit measuring voltage of the visualization apparatuses for each region cell.

Advantageous Effects

According to the visualization apparatus for a large area PEMFC according to the present invention, it is possible to manufacture the visualization apparatus approximating a large area PEMFC applied to a real system. Further, the present invention can perform the flow experiment of the large area PEMFC even in the narrow experimental space.

In addition, the present invention can observe the change in visual flow and voltage for each unit region, thereby making it possible to analyze the local unit region in the large area PEMFC.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

10: POLYMER ELECTROLYTE MEMBRANE
20: CATALYST LAYER
30: GAS DIFFUSION LAYER
40: GASKET
50: MEMBRANE ELECTRODE ASSEMBLY
60: SEPARATOR
600: CURRENT COLLECTOR PLATE
610: CHANNEL
700: TRANSPARENT PLATE
800: FUEL DISTRIBUTION STRUCTURE
900: LARGE AREA PEMFC VOLTAGE MEASURING UNIT
910: REGION CELL MONITORING UNIT
1000: VISUALIZATION APPARATUS FOR REGION CELL
2000: VISUALIZATION APPARATUS FOR LARGE AREA PEMFC

BEST MODE

Hereinafter, a visualization apparatus for a PEMFC according to the present invention will be described in detail with reference to the accompanying drawings.

Figure 1:
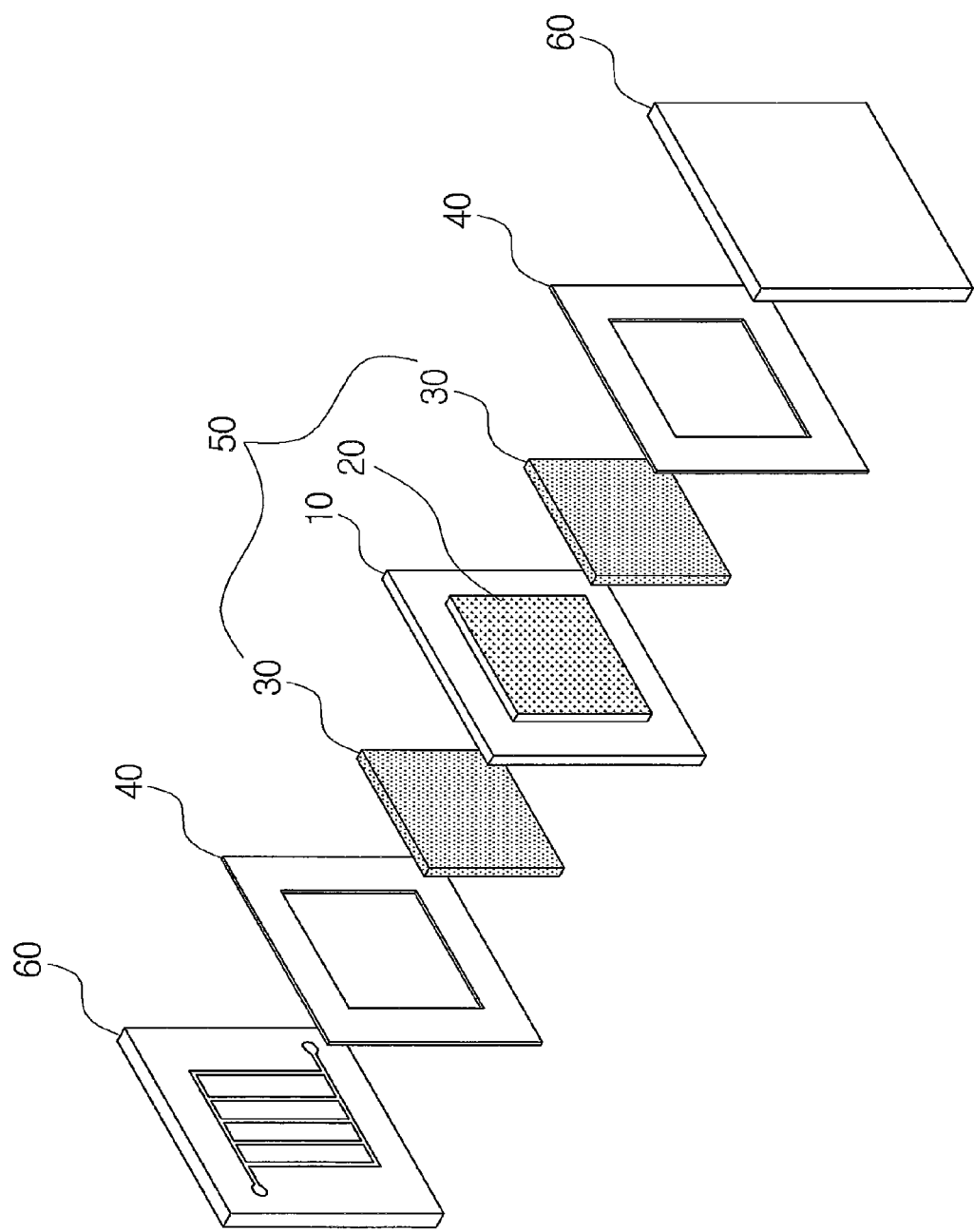
FIG. 1 is an exploded view of a real PEMFC.
Figure 2:
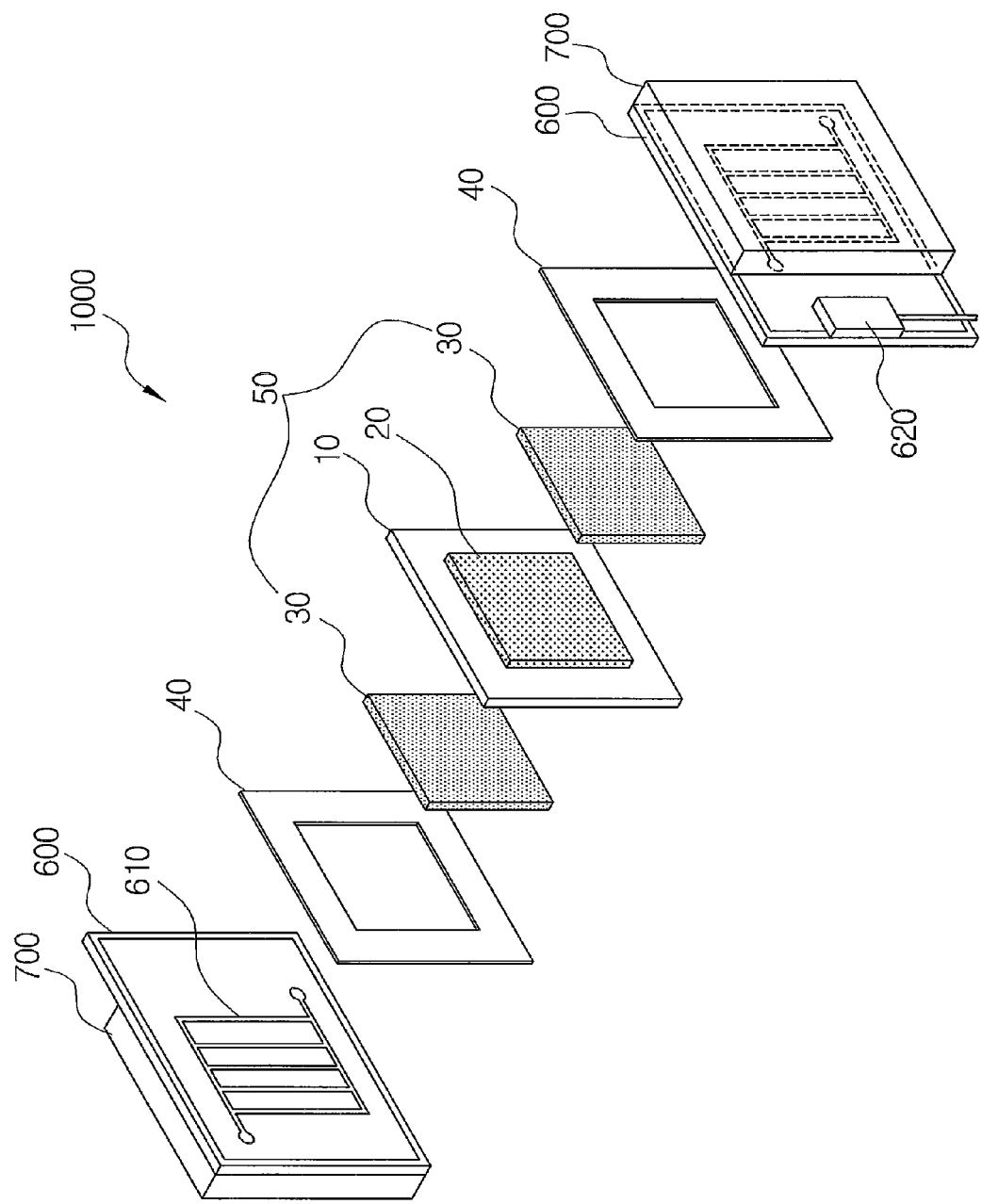
FIG. 2 is a shape of a visualization apparatus for a PEMFC for each region cell.
Figure 3:
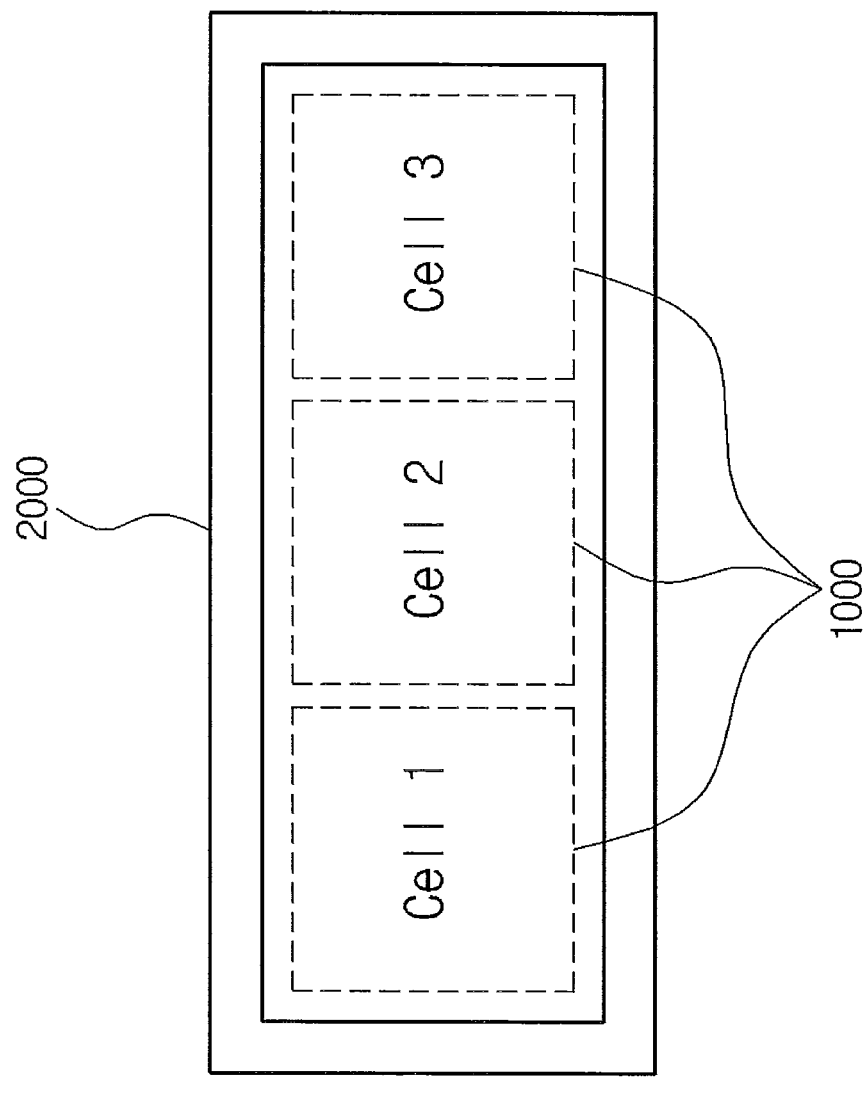
FIG. 3 is an example of dividing a large area PEMFC into a region cell.
Figure 4:
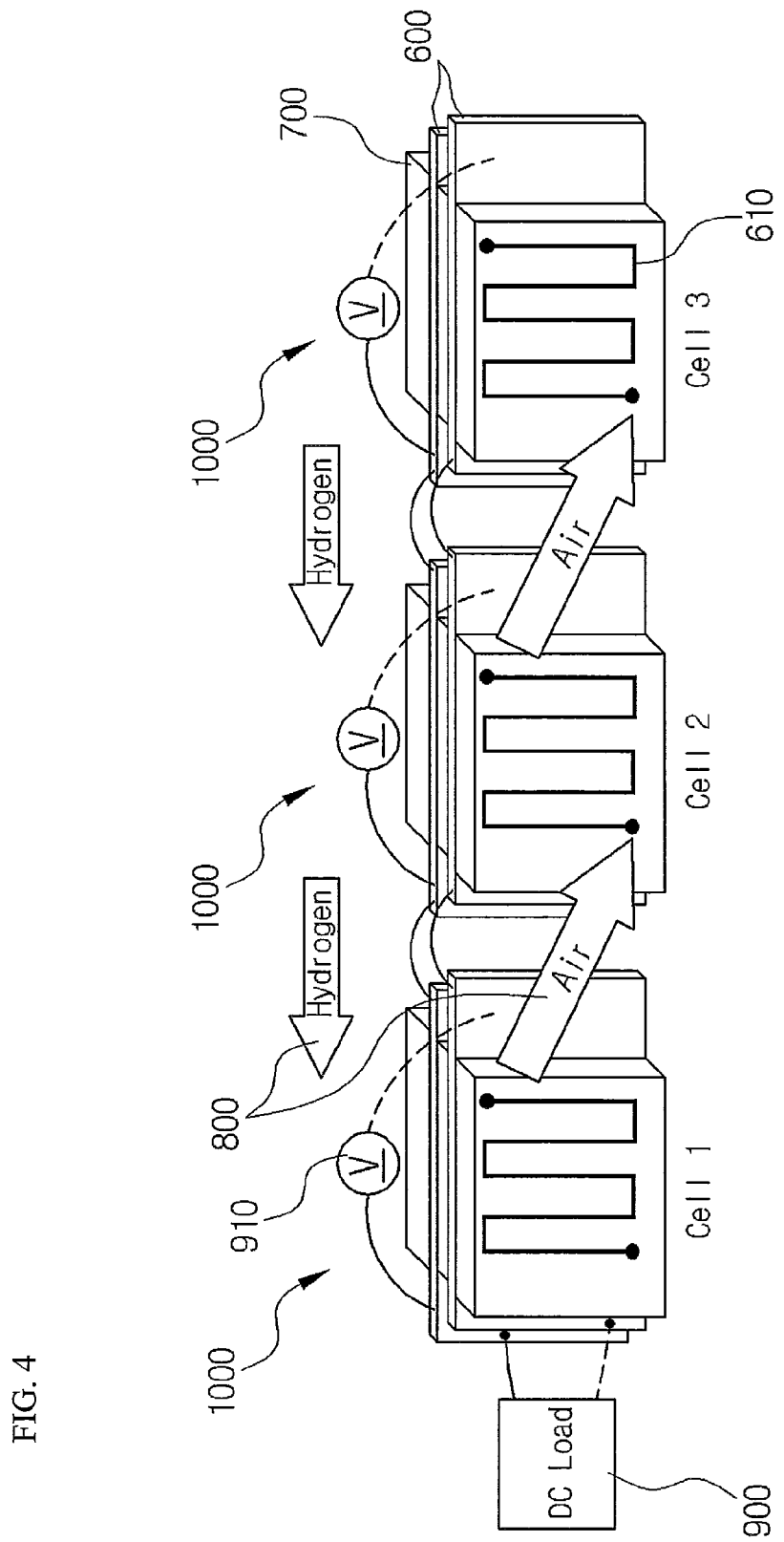
FIG. 4 is a configuration diagram of a visualization apparatus for a large area PEMFC according to the present invention.

FIG. 2 is a shape of a visualization apparatus for a region cell. FIG. 3 shows an example of dividing a large area PEMFC into a region cell and FIG. 4 is a configuration diagram of a visualization apparatus for a large area PEMFC according to the present invention.

As shown in FIG. 2, unlike a real PEMFC, a general visualization apparatus for a PEMFC includes current collector plates 600 formed with channels 610 through which reaction gas and products flow, instead of separators 60 provided at both sides of a membrane electrode assembly 50 of a PEMFC including a polymer electrolyte membrane 10, a catalyst layer 20, and gas diffusion layers 30, having a gasket 40 therebetween, and transparent plates 700 formed on the outer surface of the current collector plate 600.

The current collector plate 600 is composed of a metal plate having a thickness of about 1 mm and is provided with the channels 610 corresponding to a passage for reaction gas and products. The passage of the current collector plate 600 is visually observed through the visualization apparatus for a PEMFC.

The transparent plate 700 is configured to cover the outer surface of the current collector plate 600 and is made of a transparent material (polycarbonate, or the like) in order to observe a two-phase flow within the channel 610.

As described above, the general visualization apparatus for a PEMFC including the above-mentioned components is difficult to produce a reaction area into a large area, similar to that of a real PEMFC. Considering this aspect, the present invention divides the large area having the same size as the real PEMFC into a plurality of unit regions as shown in FIG. 3. FIG. 3 shows a case where one large area PEMFC is divided into three regions; however, the divided number or the area of each region is not limited thereto. Each region forms the visualization apparatus 1000 for region cells according to the present invention and the basic configuration thereof is the same as the configuration of FIG. 3.

Referring to FIG. 4, a visualization apparatus 2000 for a large area PEMFC according to the present invention is configured of the plurality of visualization apparatuses 1000 for region cells. The visualization apparatuses 1000 for each region cell are electrically connected to each other in parallel. More particularly, the anode current collector plates 600 of the visualization apparatuses 1000 for each region cell are electrically connected with the cathode current collector plates 600 of the visualization apparatuses 1000 for other adjacent region cells. Similarly, as the cathode current collector plates 600 of the visualization apparatuses 1000 for each region cell are electrically connected with the anode current collector plates 600 of the visualization apparatuses 1000 for other adjacent region cells, the visualization apparatuses 1000 for each region cell are electrically connected to each other in parallel, which has the same current collection flow as the single large area visualization apparatus.

In this case, fuel distribution structures 800 of anode fuel and cathode fuel supplied to the channels 610 formed on each current collector plate 600 are connected to each other in series in order to implement the flow in the single large area visualization apparatus. As shown in FIG. 4, fuel flowing through the anode and cathode channels 610 of the visualization apparatus 1000 for a region cell is supplied to each of the anode and cathode channels 610 of the visualization apparatus 1000 for adjacent region cells.

Since the visualization apparatus 2000 for a large area PEMFC according to the present invention is provided with the separate transparent plates 700 for each unit region, it is possible to discriminate any change in flow in each region in the large area PEMFC and visually observe the change in flow.

In addition, voltage generated from the entire large area PEMFC can be measured by a large area PEMFC voltage measuring unit 900 from the anode current collector plates 600 and the cathode current collector plates 600 of the visualization apparatus 1000 for a region cell disposed at one end thereof and the visualization apparatus for a region cell includes a region cell monitoring unit 910 measuring voltage of each region cell by grounding the anode current collector plates 600 and the cathode current collector plates 600 for each region cell to observe each region cell.

The present invention is not limited to the embodiment described herein and it should be understood that the present invention may be modified and changed in various ways without departing from the spirit and the scope of the present invention. Therefore, it should be appreciated that the modifications and changes are included in the claims of the present invention.

The invention claimed is:

1. A visualization apparatus (2000) for a proton exchange membrane fuel cell (PEMFC), comprising:

a plurality of visualization apparatuses (1000) for region cells including a first current collector plate (600) provided at a first side of a membrane electrode assembly (50) of a PEMFC and a second current collector plate (600) provided at a second side of the membrane electrode assembly (50) of the PEMFC, each current collector plate (600) formed with channels (610) through which reaction gas and products flow, and transparent plates (700) provided at outer surfaces of the current collector plates (600), wherein it is configured by electrically connecting the current collector plates of the visualization apparatuses (1000) for region cells to each other in parallel; and a region cell monitoring unit (910) measuring voltage of the visualization apparatuses (1000) for each region cell, wherein fuel distribution structures (800) supplying reaction gas to the channels (610) of the visualization apparatuses (1000) for each region cell and discharging products from the channels (610) are connected to each other in series.

* * * * *